May 9, 1967 K. A. McHENRY ET AL 3,317,990
SET SCREW DRIVER
Filed July 29, 1964 15 Sheets-Sheet 3
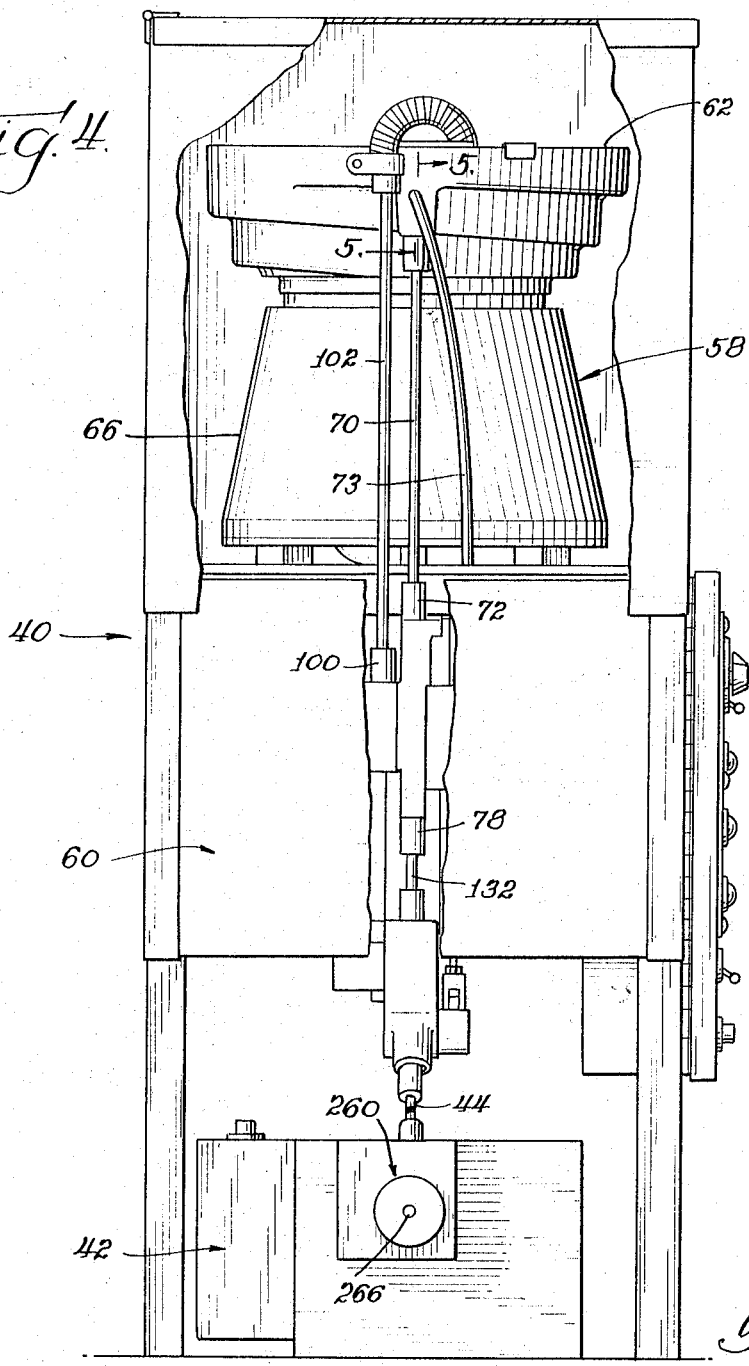
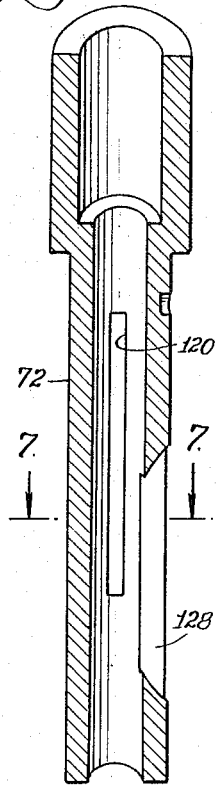
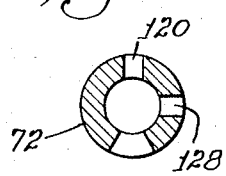
Inventors
Kenneth A. McHenry
and Lester A. Amtsberg
By Stephen J. Rudy
Atty.

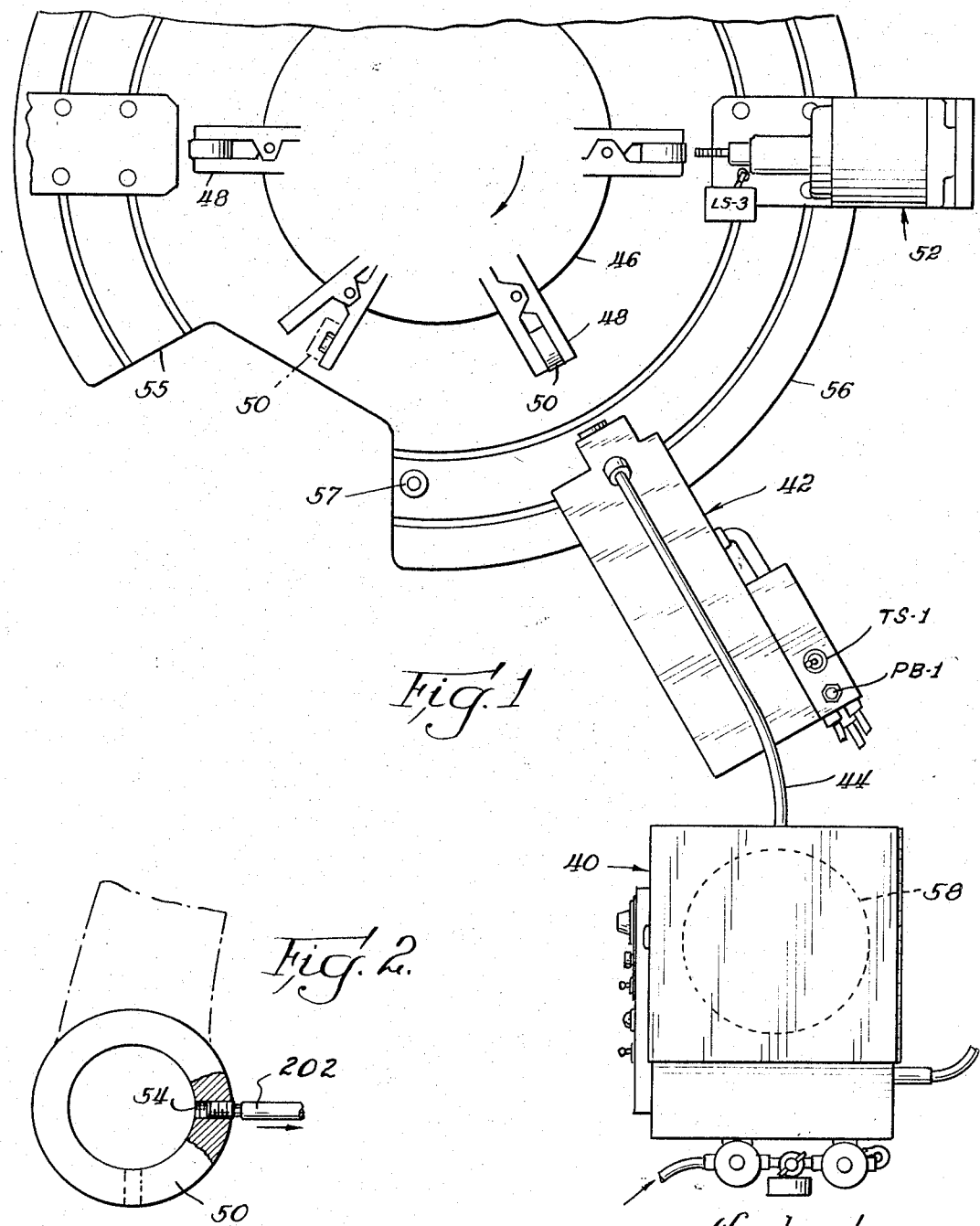

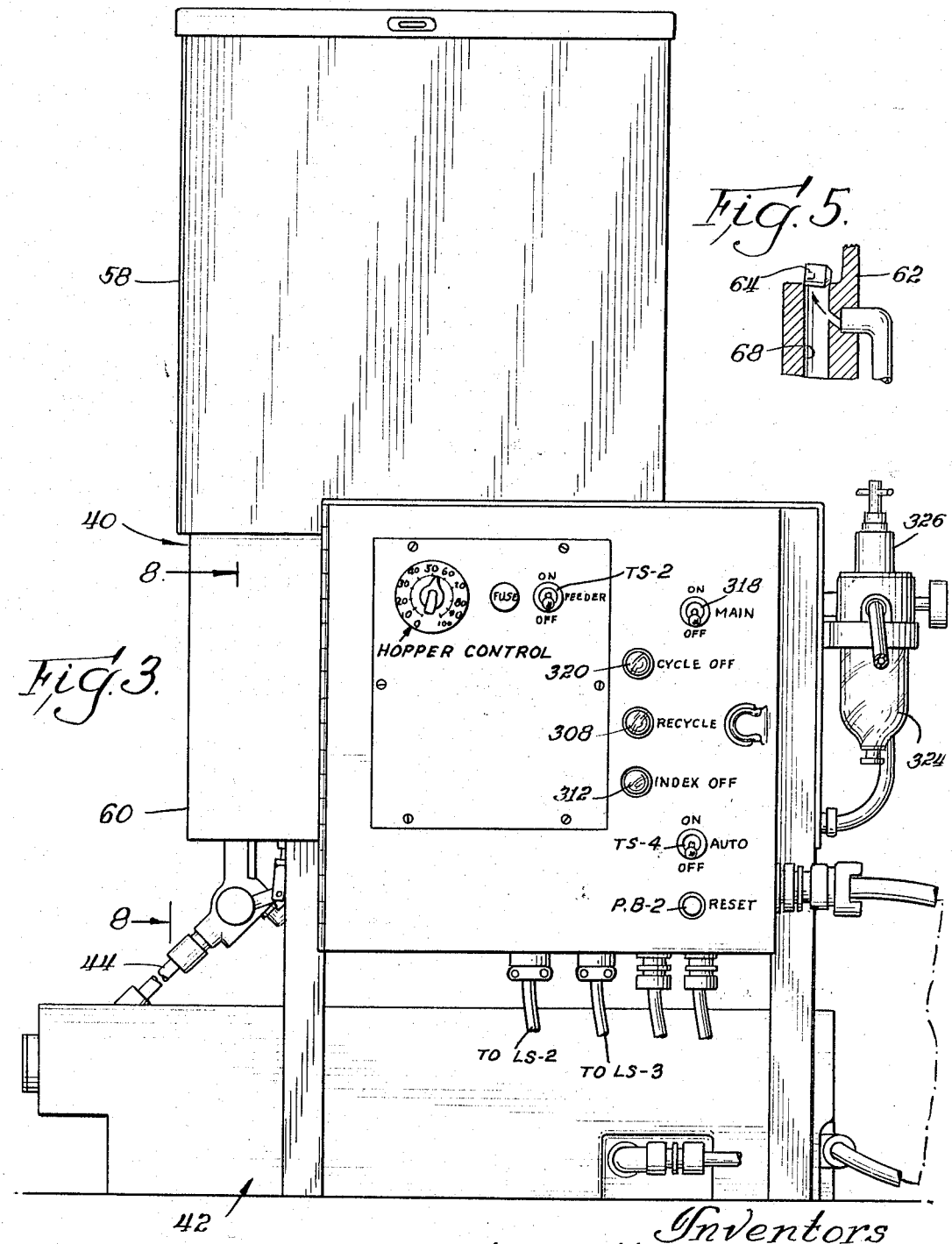

May 9, 1967  K. A. McHENRY ET AL  3,317,990
SET SCREW DRIVER
Filed July 29, 1964  15 Sheets-Sheet 4
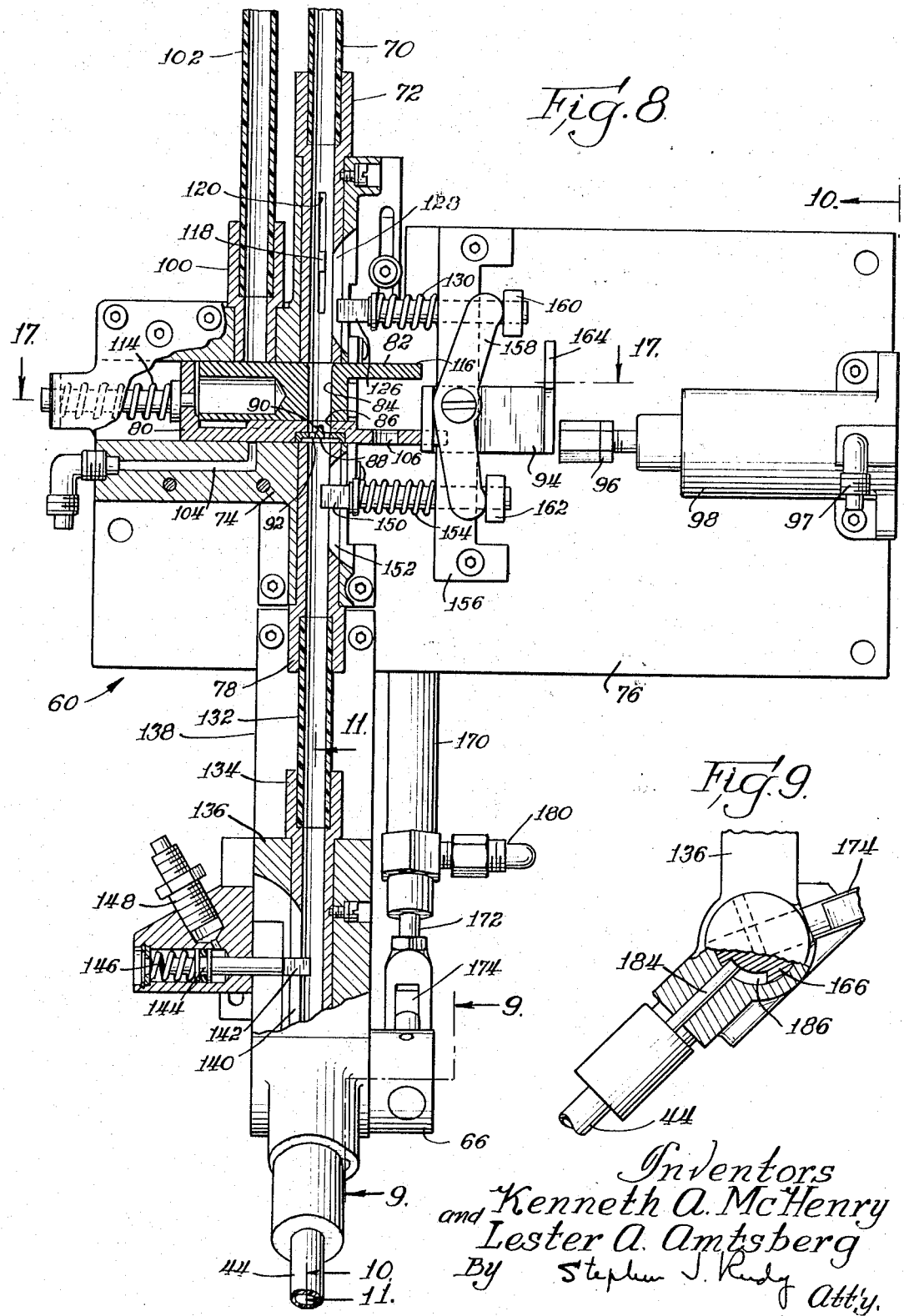
Inventors
Kenneth A. McHenry
and Lester A. Amtsberg
By Stephen J. Rudy
Atty.

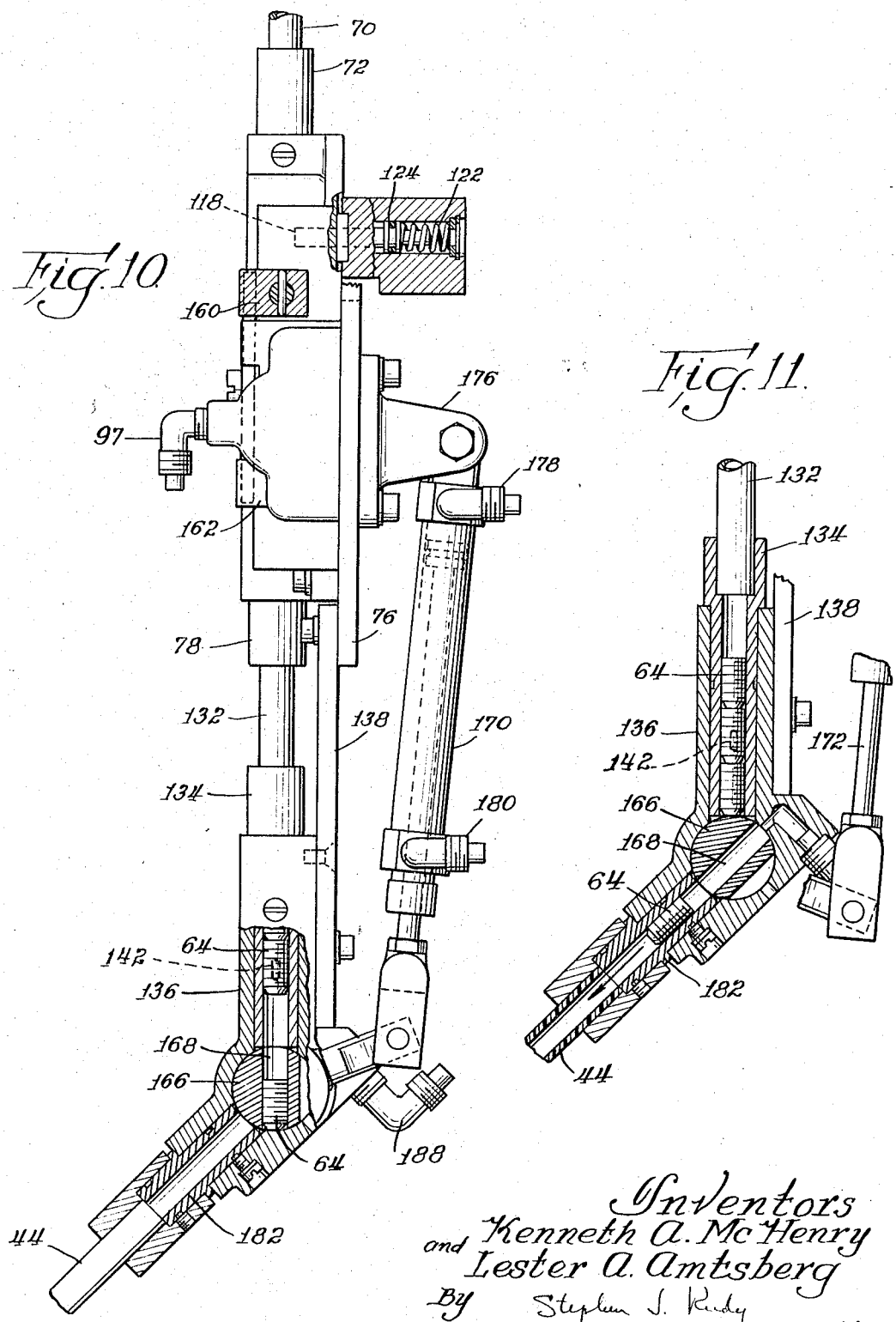

Inventors
Kenneth A. McHenry
and Lester A. Arntsberg
By Stephen J. Rudy
Att'y

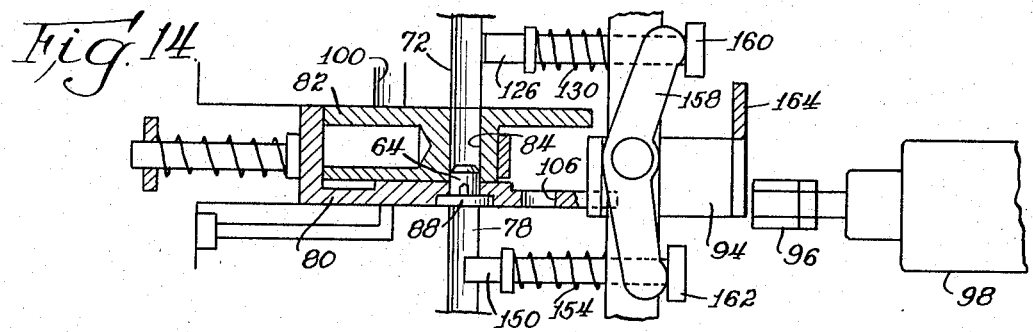
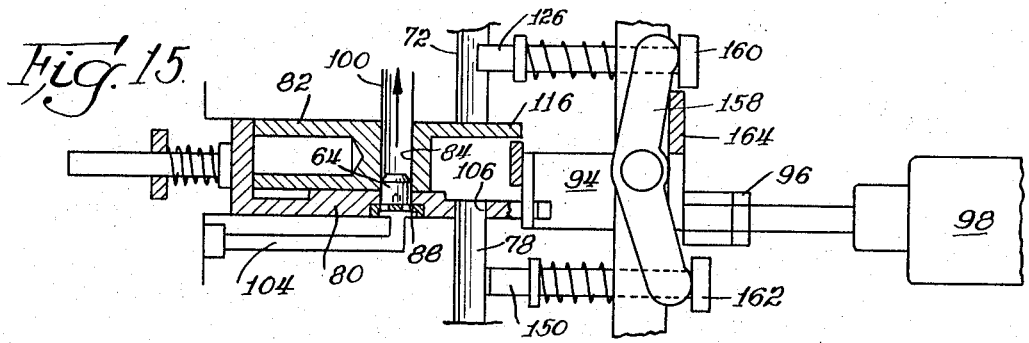
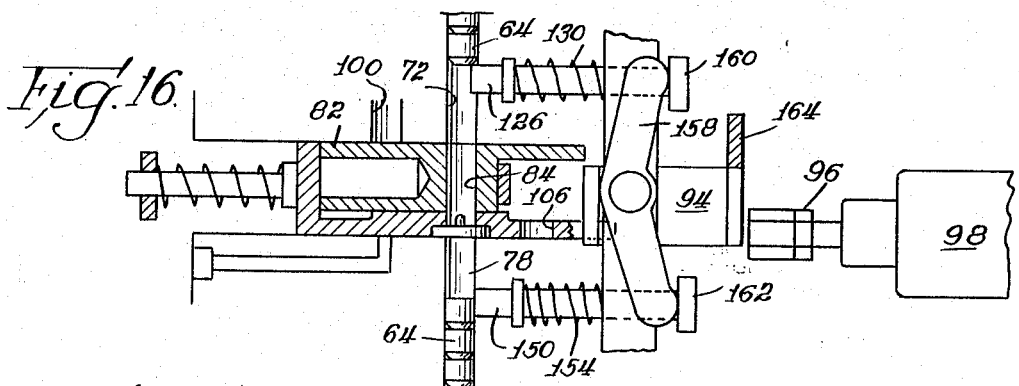
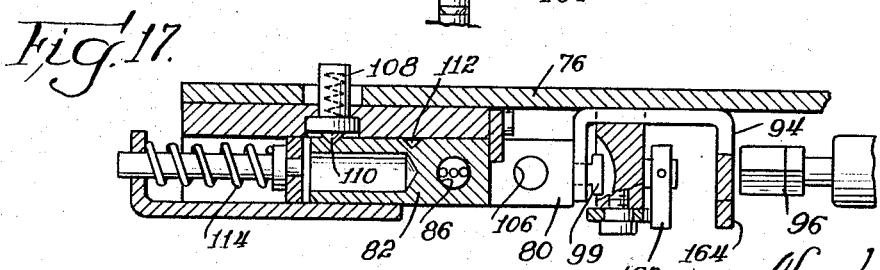
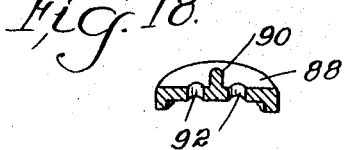

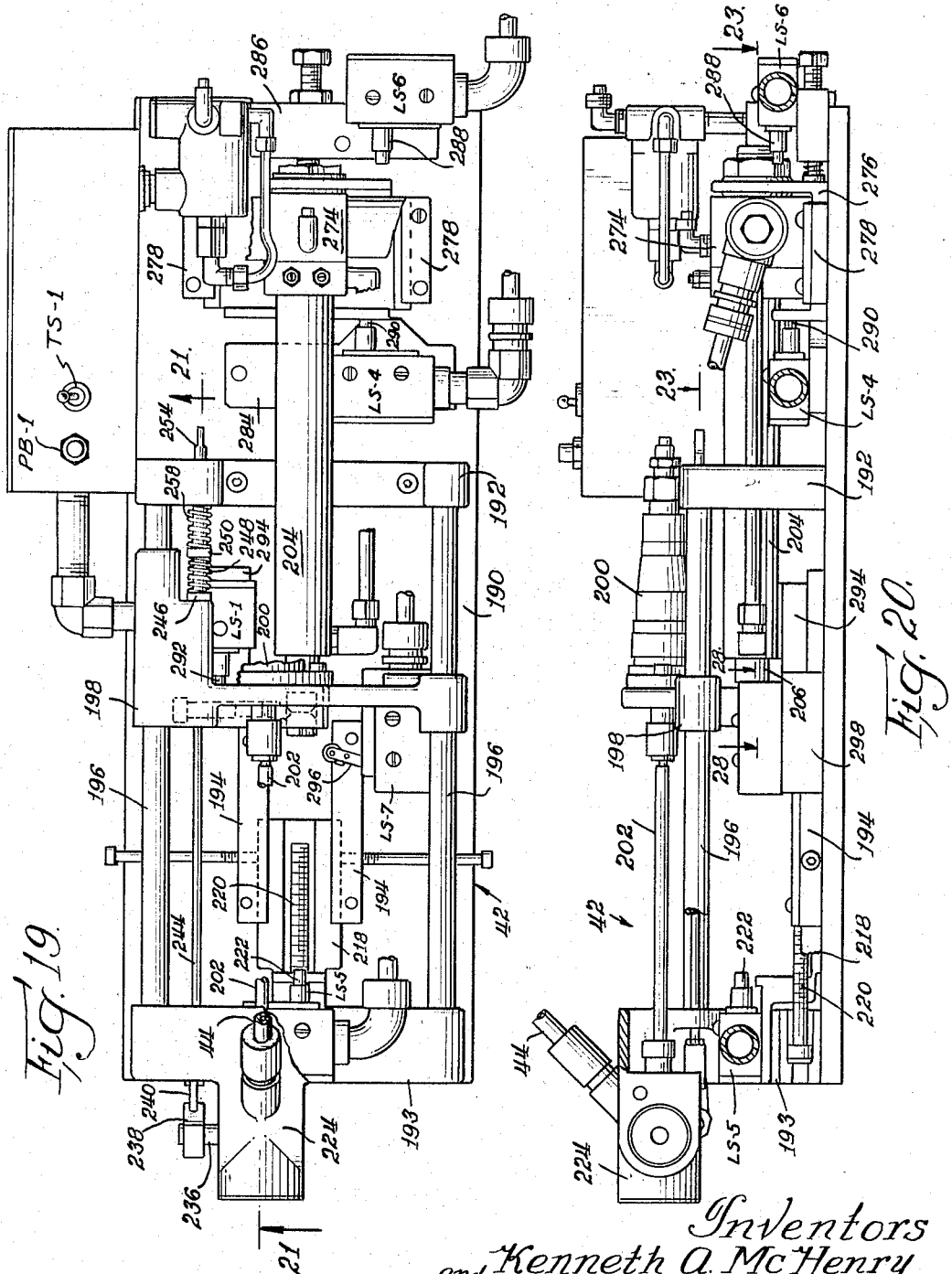

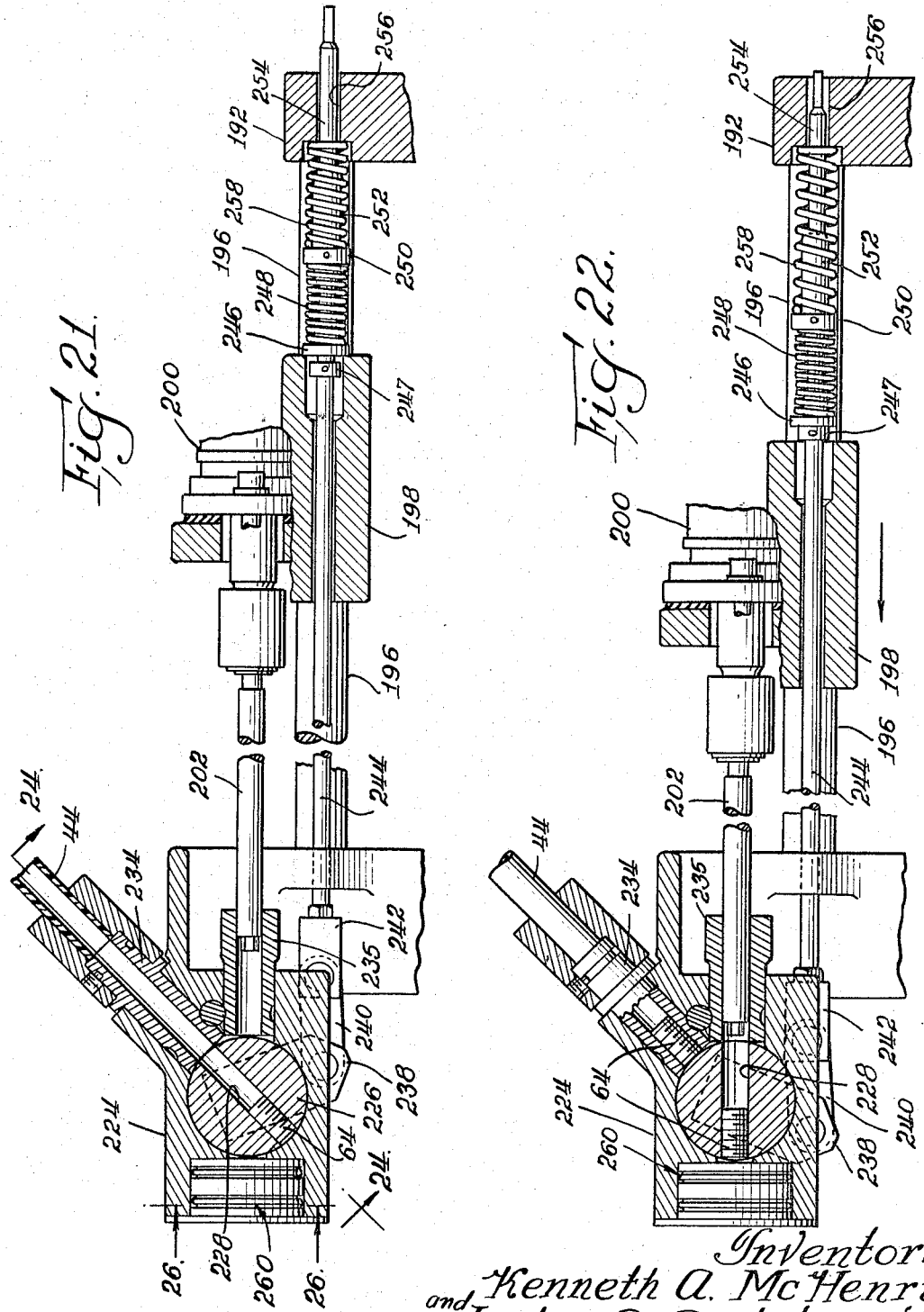

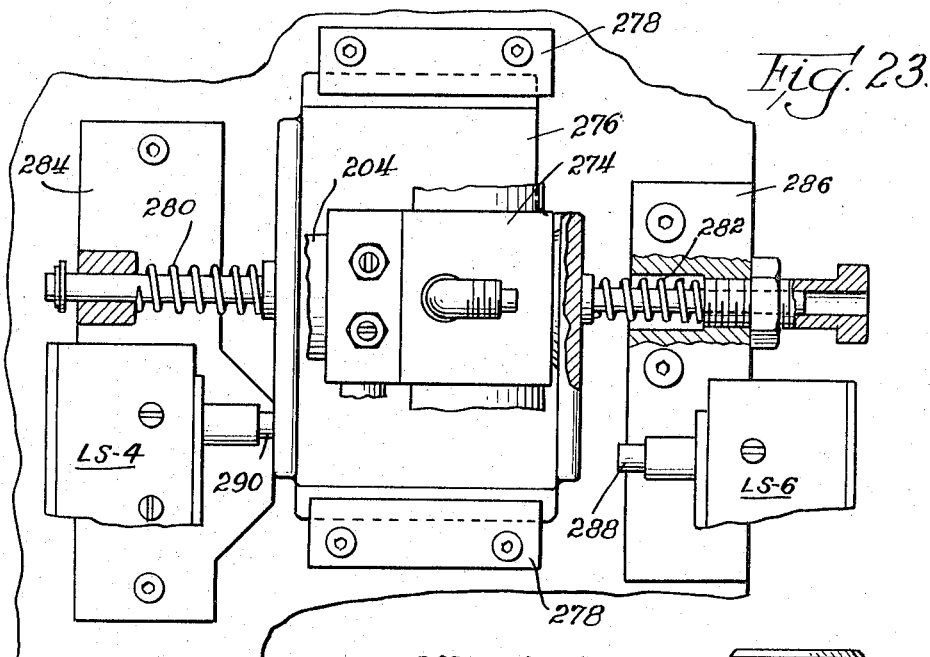
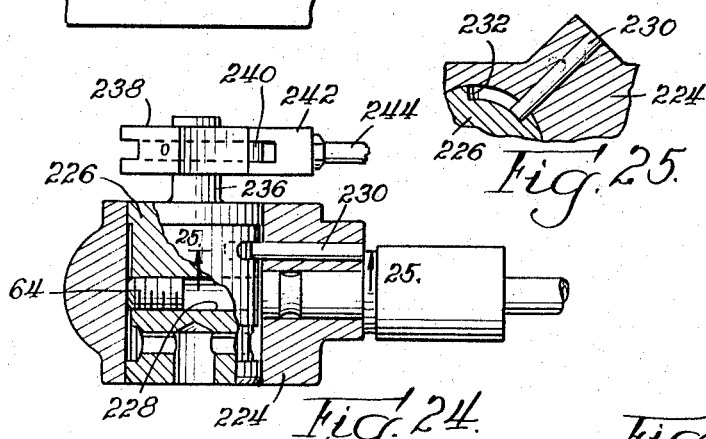
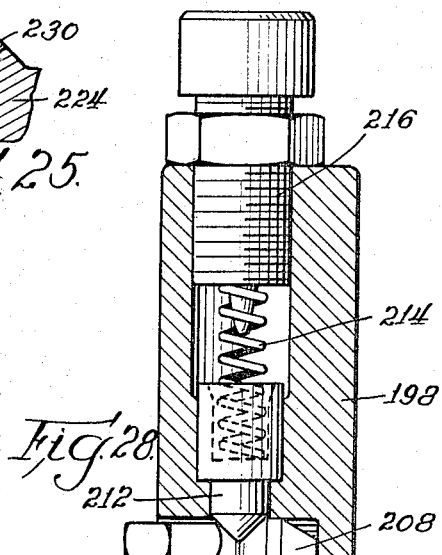
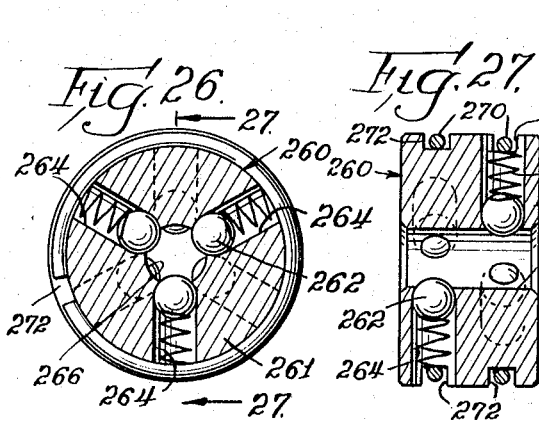
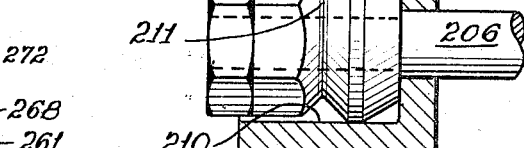
Inventors
Kenneth A. McHenry
and Lester A. Amtsberg
By Stephen J. Rudy Atty.

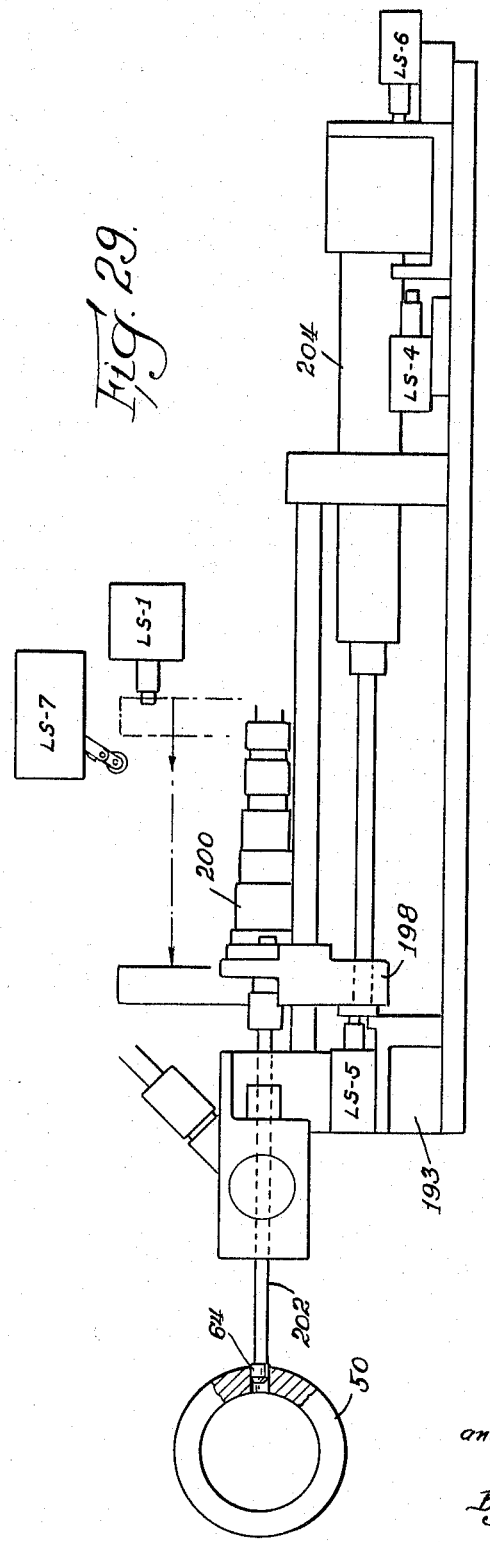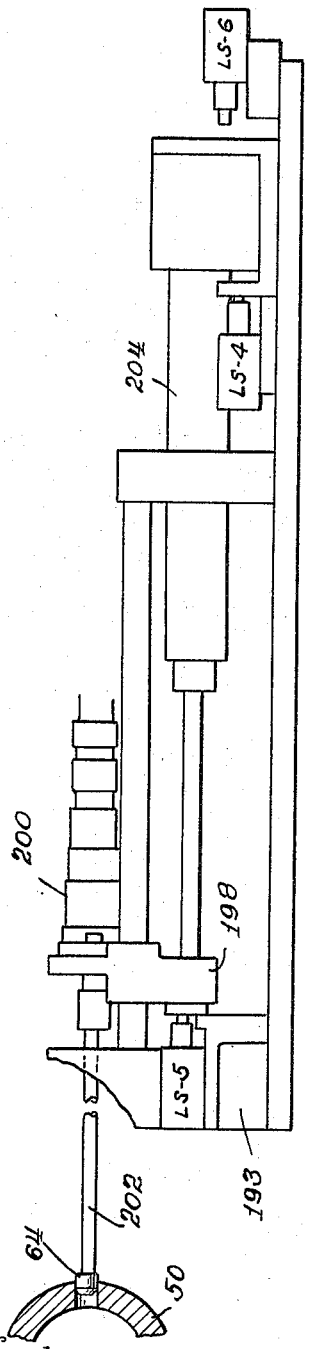

May 9, 1967  K. A. McHENRY ET AL  3,317,990
SET SCREW DRIVER
Filed July 29, 1964  15 Sheets-Sheet 12
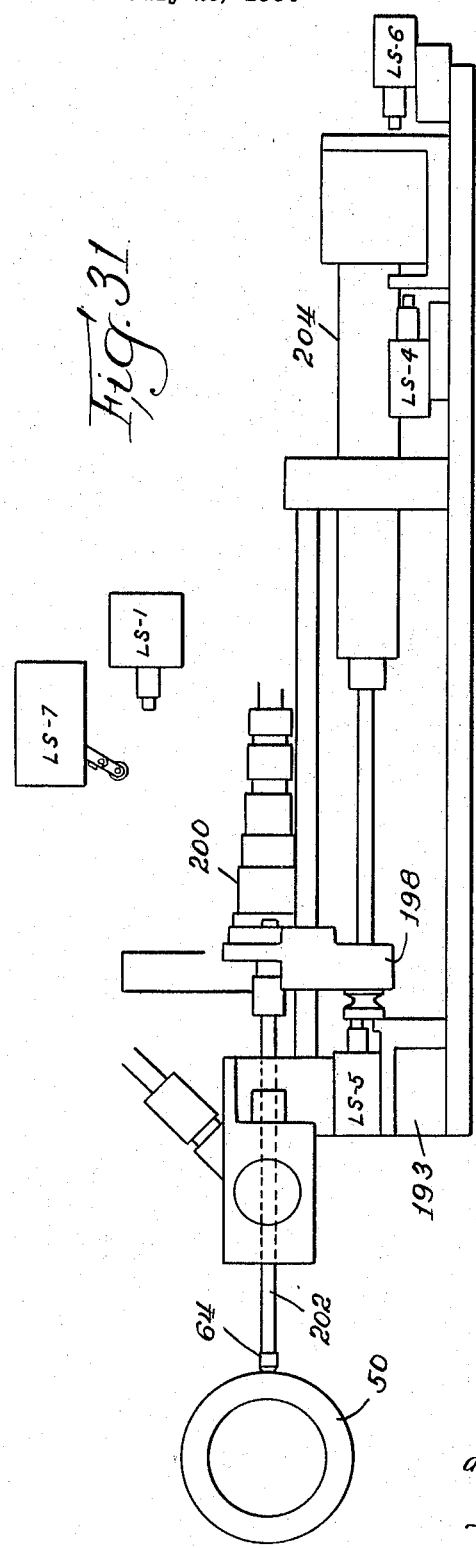
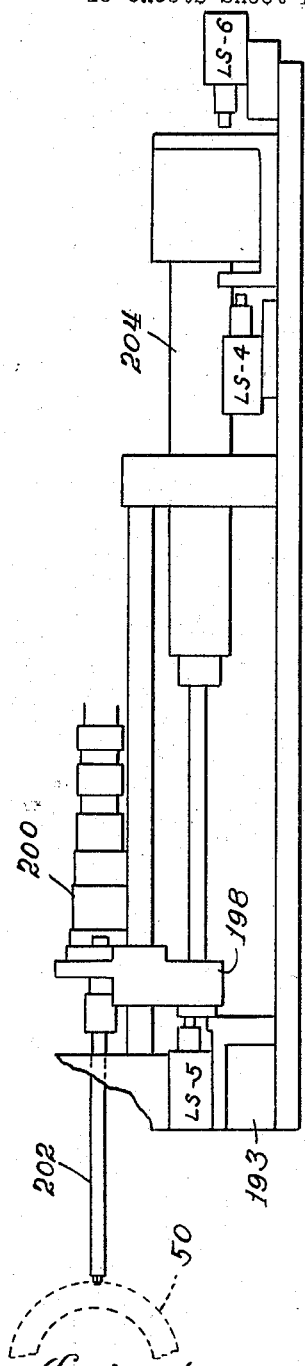
Inventors
Kenneth A. McHenry
and Lester A. Amtsberg
By Stephen J. Rudy
Atty Inventors
Kenneth A. McHenry and
Lester A. Amtsperg
By Stephen J. Rudy Att'y.

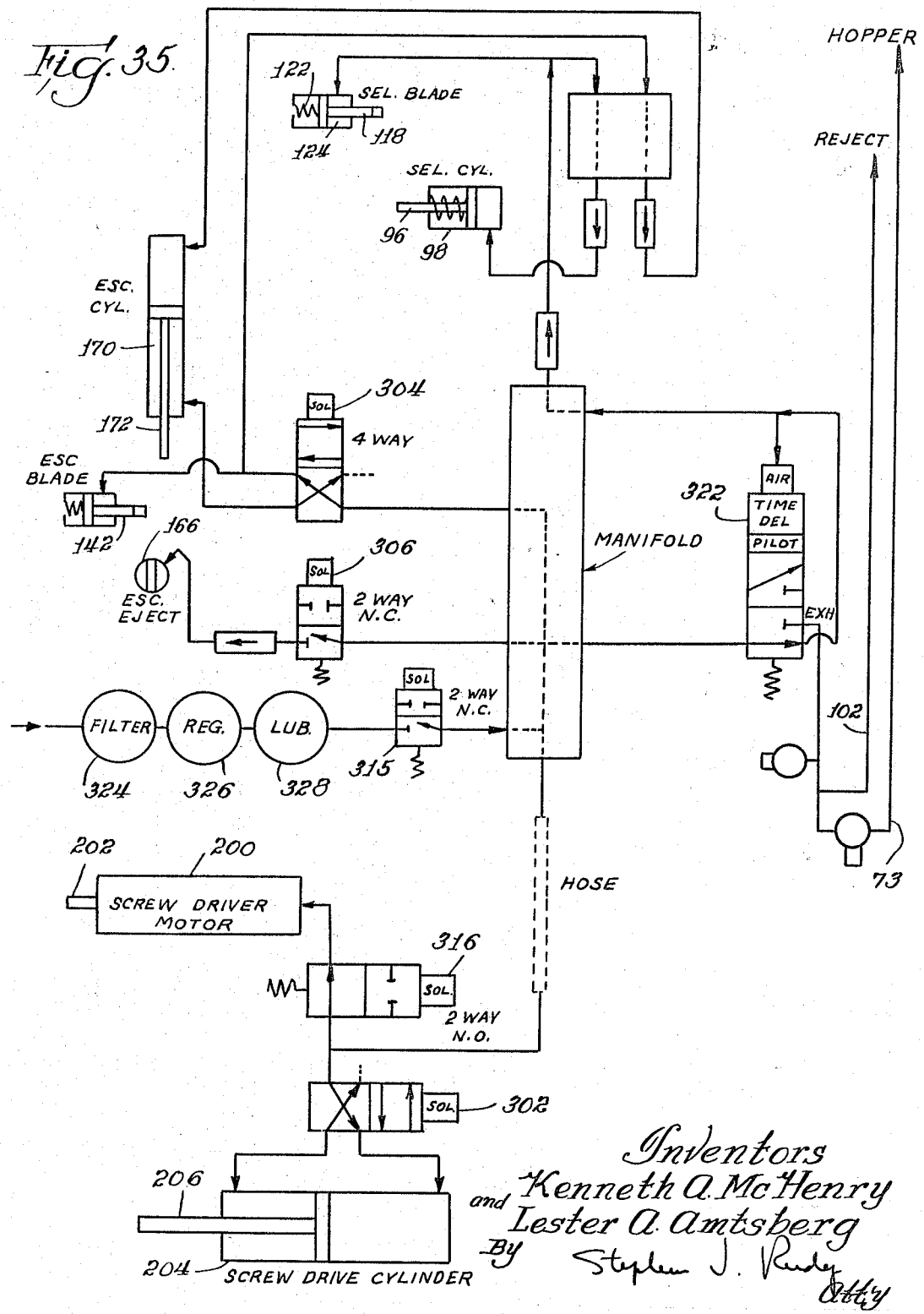

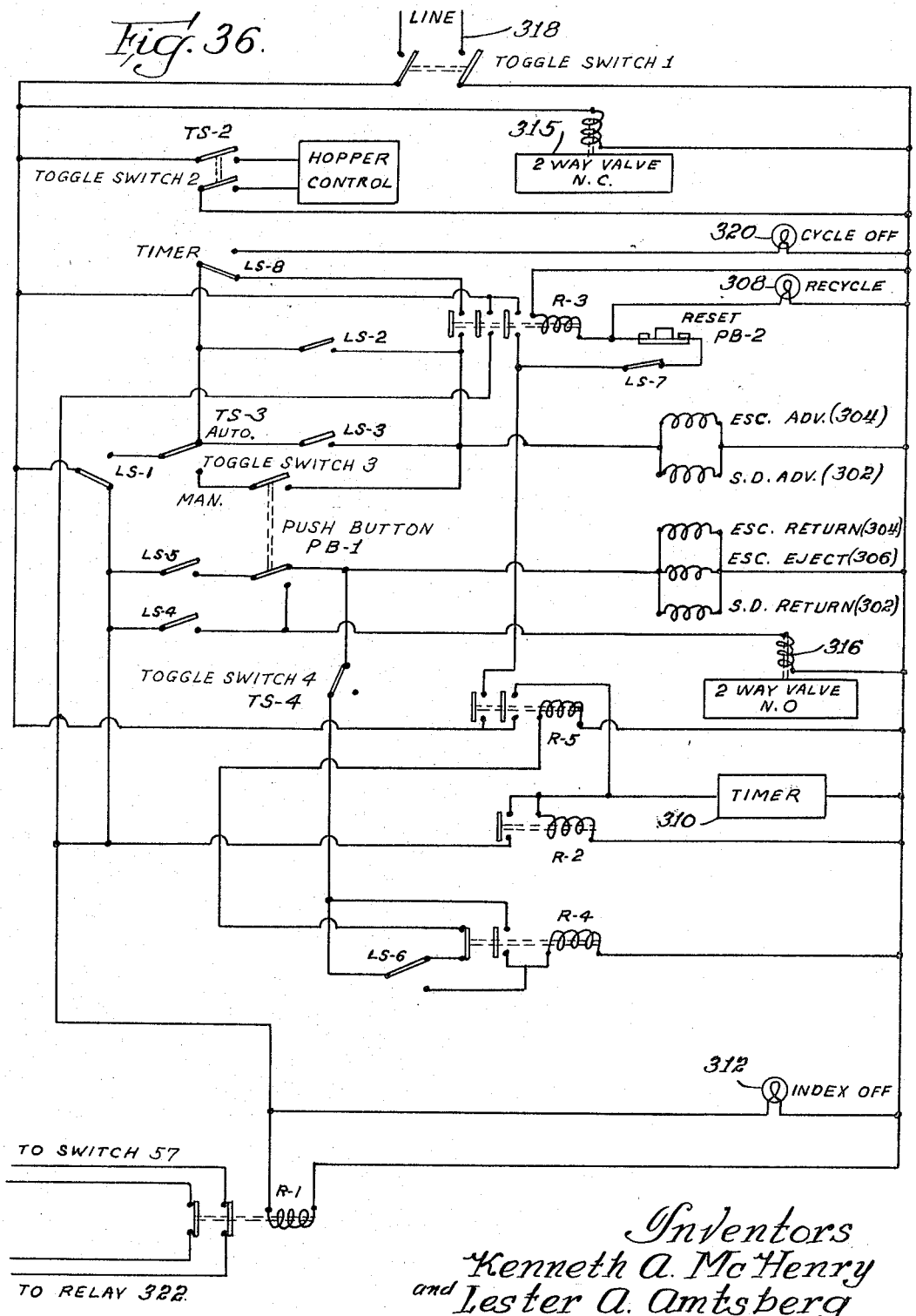

United States Patent Office 3,317,990
Patented May 9, 1967

3,317,990
SET SCREW DRIVER
Kenneth A. McHenry, Clinton, and Lester A. Amtsberg, Utica, N.Y., assignors to Chicago Pneumatic Tool Company, New York, N.Y., a corporation of New Jersey
Filed July 29, 1964, Ser. No. 386,037
23 Claims. (Cl. 29—407)

This invention relates to a method and means for automatically selecting and applying homogeneous fastener elements in a pre-designated manner to workpieces being produced in high volume quantity.

In many high volume manufacturing operations, it is required to insert fastener elements, such as socket type set screws, into a workpiece. For example, in the fabrication of a bushing type collar, it is desired to insert a set screw in the collar prior to packaging and shipment thereof; the device of the present invention is adapted to receive set screws from a vibratory hopper and to set one screw at a time into a tapped hole formed in the collar, and assure that each collar will have a screw set to a predetermined depth, such operation being performed in a sequential manner on subsequent collars for any period of time.

Briefly, the device of the invention utilizes a vibratory hopper into which the fastener elements are placed, and from which they are dispensed into a feed tube in a random manner. A selector mechanism senses the orientation of the screws in the tube and returns improperly oriented screws to the vibratory hopper. The screws which are properly oriented are passed into another tube from which they are dispensed in sequential and intermittent manner to a screw driving assemblage. The screw driving assemblage includes a constantly rotating screwdriver which engages one screw at a time and rotates the screw into a hole tapped in a workpiece.

The device of the invention is characterized by many features not found in comparable devices of the prior art. More particularly, the device of the invention will operate to assure that each workpiece has a set screw placed in predetermined position, and will not allow a faulty workpiece to pass undetected from the work station. Thus, the device of the invention functions to provide a final inspection operation to determine if the set screw is properly secured in each workpiece being handled. In addition, the device of the invention is arranged so that there can be no jamming, or breakage of the screwdriver under certain adverse conditions of operation, as will be discussed hereinafter. An important feature of the invention is that the storage portion of the device, i.e., the vibratory hopper and associated mechanism, can be located a considerable distance from the screw driving assemblage, up to as much as twenty-five feet.

The main object of this invention is to provide a method and means for automatically selecting and applying a fastener element to a workpiece.

A more specific object is to provide a device for receiving fastener elements from a dispensing means, selecting properly oriented fastener elements and passing them onward to a fastener handling means adapted to set the fasteners in predetermined and sequential manner in workpieces.

A further object is to provide a device for automatically selecting and setting fastener elements in a workpiece positioned at a work station, whereby a workpiece will not be passed from the station unless a fastener element has been properly applied to the workpiece.

Still another object of the invention is to provide a device for automatically selecting and applying fastener elements to a workpiece, which device will operate without damage to itself if jamming should occur during a fastener setting operation.

A further object of the invention is to provide a device for receiving fastener elements from a vibratory hopper and applying individual fasteners in sequential manner to workpieces mounted upon a rotary workpiece holding table, which device will cycle operation of the table.

Still another object of the invention is to provide a fastener selecting and positioning device which can be conditioned to handle screws of different sizes, including so-called "square" socket type set screws.

A further object of the invention is to provide a device which will receive fastener devices from a vibratory hopper and pass them to a fastener setting assemblage located a considerable distance from the vibratory hopper.

Another object is to provide a fastener holding collet assemblage which will receive and properly support a fastener while it is being engaged and driven by a screw or wrench element.

Still another object of the invention is to provide an automatic fastener element setting device characterized by an ability to operate continuously over long periods of time without the need for operator attendance.

These and further objects and features of the invention will become more apparent from the following description and accompanying drawings wherein:

FIG. 1 is a plan view illustrating apparatus embodying the principles of the invention showing the same in operative position relative to a turntable having work stations for support of workpieces being fabricated;

FIG. 2 is a fragmentary and partial section view of a type of workpiece under consideration;

FIG. 3 is an enlarged side elevational view of the apparatus of FIG. 1 but with a driver unit under a main assemblage of the apparatus;

FIG. 4 is the same but illustrating a front elevation view with a portion of an encasement removed;

FIG. 5 is a fragmentary section view of a fastener return detail of the apparatus as seen along line 5—5 in FIG. 4;

FIG. 6 is a sectional isometric view of a selector tube used in the apparatus of FIG. 3;

FIG. 7 is a section view generally as seen along line 7—7 in FIG. 6;

FIG. 8 is an enlarged partial section view generally as seen along line 8—8 in FIG. 3;

FIG. 9 is a partial section view generally as seen along line 9—9 in FIG. 8;

FIG. 10 is a partial section view generally as seen along line 10—10 in FIG. 8;

FIG. 11 is a section view generally as seen along line 11—11 in FIG. 8;

FIGS. 12 through 16 are schematic-like illustrations of a portion of the apparatus in FIG. 8, and showing various operational positions;

FIG. 17 is a section view generally as seen along line 17—17 in FIG. 8;

FIG. 18 is a sectional isometric view of a selector disc used in the apparatus as seen in FIG. 8;

FIG. 19 is a plan view of a driver unit assemblage used in the apparatus of FIG. 1;

FIG. 20 is a side elevation view of the same;

FIG. 21 is an enlarged partial section view as generally seen along line 21—21 in FIG. 19;

FIG. 22 is the same but showing another operational position;

FIG. 23 is a fragmentary partial section view generally as seen along line 23—23 in FIG. 20;

FIG. 24 is a partial section view generally as seen along line 24—24 in FIG. 21;

FIG. 25 is a fragmentary sectional view as generally seen along line 25—25 in FIG. 24;

FIG. 26 is an enlarged section view generally as seen along line 26—26 in FIG. 21;

FIG. 27 is a section view generally as seen along line 27—27 in FIG. 26;

FIG. 28 is an enlarged section view generally as seen along line 28—28 in FIG. 20;

FIGS. 29 through 32 are schematic illustrations in vertical projection of the driver unit assemblage in FIG. 20, and showing various operational positions;

FIG. 35 is a schematic view illustrating various elements of the apparatus and showing the pneumatic circuit associated therewith; and FIG. 36 is an electrical circuit diagram utilized in the apparatus of the invention.

Figure 12:
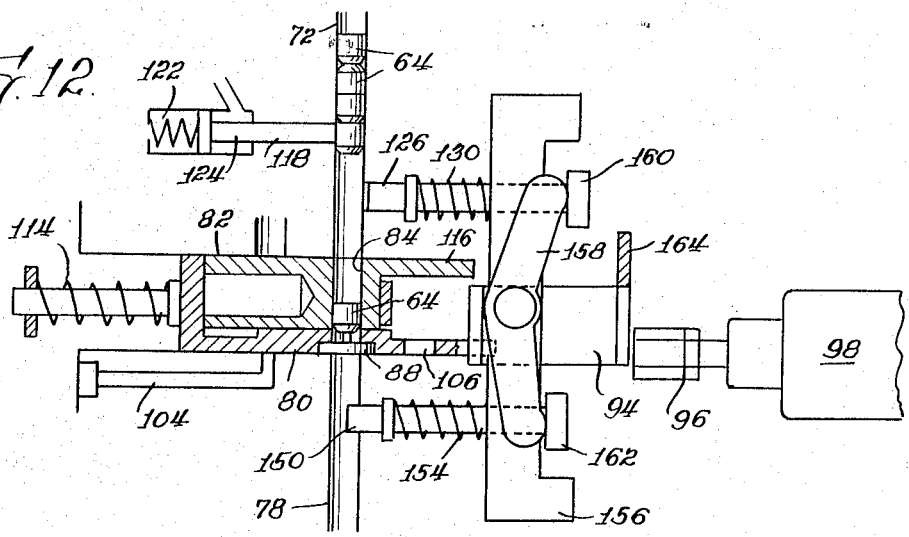

Referring now to the drawings and more particularly to FIGS. 1 to 4, apparatus illustrative of an embodiment of the invention is shown which apparatus includes a fastener storage and delivery assemblage 40, a fastener driving assemblage 42, and a flexible hose 44 extending between the two assemblages. As seen in FIG. 1, the apparatus is positioned relative to a rotary work table 46 having a plurality of workpiece holding means 48 mounted thereupon in angularly spaced relation. Means (not shown) are provided for operation of each of the holding means 48 whereby workpieces 50 may be positioned as required for performance of any desired work operation thereupon. For example, a hole tapping unit 52 may be arranged for tapping a hole 54 in each workpiece as the latter is rotated, or indexed into proper alignment with the tapping unit 52. Another unit, such as a drilling assemblage (not shown) may be arranged for drilling the hole 54 in the workpiece. Such operational units may be secured to a stationary circular table 56, which affords the required angular spacing of the operational units. A recess 55 may be formed in the table 56 to afford space for the operator so that he may handle the parts 50 in a convenient manner. A switch 57 is provided in a readily accessible spot adjacent the recess 55, which switch is used by the operator to control operation of certain units mounted upon the table 56. The present invention is not basically concerned with the type and disposition of whatever auxiliary operational units are involved in any given setup, except to the extent that the apparatus of the invention may be conditioned to control the cycling thereof, as will appear more fully hereinafter.

Basically, the apparatus of the invention is concerned with the automatic application of a fastener to a workpiece, which is brought into and maintained in alignment with a fastener setting element of the driving assemblage 42. The latter, in cooperation with the storage and delivery assemblage 40, functions to properly install various types of fastener elements, such as a set screw, in workpieces in a sequential and continuous manner. As will be more apparent hereinafter, the apparatus not only functions to perform the designated operation, but in addition, will provide an automatic inspection service whereby no workpiece will leave the fastener application station without a fastener properly applied to the workpiece. In event of a faulty workpiece, i.e., one devoid of a properly threaded hole, the apparatus will automatically shut down and signal such a condition, and will not resume operation until the condition responsible for such shut-down is corrected.

The storage and delivery assemblage 40, as best seen in FIGS. 3 and 4, includes a fastener storage and dispensing unit in the form of a vibratory hopper 58, and a fastener selector and delivery unit 60. The latter includes various components both pneumatically and electrically operated, as well as the control circuitry for operation of components in the delivery unit 60 and components in the fastener driving assemblage 42.

The vibratory hopper 58 may be of the conventional type which essentially comprises a bowl 62 having a peripherally disposed ramp for conveying items, such as set screws 64 (FIG. 5), in the bowl from the bottom to the top thereof by reason of vibratory action induced by an electrically operated vibrator arranged in a base 66. At the upper extremity of the bowl ramp, the screws 64 fall into a vertically disposed passageway 68 provided at the bowl periphery, from whence they enter a hose, or pipe 70, the lower end of which extends into and is secured to an upper feed tube 72. The latter is positioned in a housing, or frame 74 supported upon a plate 76 forming part of the selector and delivery unit 60, as seen in FIG. 8. A pipe, or tube 73 is arranged to direct compressed air intermittently upwardly in passageway 68 to release any set screw which may become lodged in the opening of passageway 68.

The feed tube 72 is in axial alignment and spaced from a lower feed tube 78 supported in the housing 74. Slidably mounted between the ends of the tubes 72 and 78 is a selector mechanism including a slide piece 80 and a block 82. The selector mechanism is mounted in the frame 74 for horizontal movement, the arrangement being such that the slide 80 can move together with the block 82 (FIG. 15), or can move independently of the block (FIG. 13), for the purpose of either respectively rejecting a fastener or passing a fastener.

The block 82 is provided with a vertically disposed passageway 84 which is of similar diameter to the inner diameter of the feed tubes 72 and 78, and which is in axial alignment therewith in one position of travel (FIG. 8). The slide piece 80 is provided with a similar passageway 86 having an enlarged lower end for receipt of a selector disc 88. The latter is formed with a center pin 90 which projects upwardly from the body of the disc and terminates short of the upper surface of the slide piece 80. A plurality of holes 92 are formed in the disc 88, which holes are disposed about the pin within the area of the passageway 86. Slide piece 80 is shifted horizontally by means of a yoke element 94 activated by a plunger 96 forming part of an air operated motor 98 which is connected to a supply source by way of pipe fitting 97. Such shifting movement of the slide piece may be transmitted to the block 82 when a fastener element 64 is being delivered in undesired position. The yoke element 94 is coupled to the slide piece 80 by means of a T-shaped key 99, as best seen in FIG. 17.

To illustrate, consider the situation depicted in FIGS. 14 and 15. Note that a fastener element 64, e.g., set screw, has been delivered in reject position, that is, with the open, or socket end, down. As a result, the set screw will drop upon the disc 88 so that the pin 90 will enter the set screw socket hole. In such position, it will be seen that the set screw will key the block 82 to the slide piece 80 so that shifting movement of the slide piece will cause similar movement of the block. The reason for such joint movement of the slide piece and the block is for alignment of the passageways 84 and 86 with a reject tube 100 whereby a rejected fastener will be returned to the hopper bowl 62 via a hose or pipe 102. Toward this end, compressed air is directed through a passageway 104 formed in the housing 74, which air passes through the holes 92 of the disc 88 and lifts the rejected set screw up into the pipe 102 and back into the hopper bowl 62.

In the case of a set screw 64 (FIG. 12) delivered in acceptable position, the solid point of the screw will abut the end of the disc pin 90 (FIG. 8). In such position, it will be seen that the lower end of the screw is in substantial alignment with the upper surface of the slide piece 80 so that it will not key the slide piece to the block 82. Accordingly, upon shifting movement of the slide piece, the set screw will drop through a hole 106 formed in a horizontal extension of the slide piece and pass on into the lower feed tube 78.

A spring-loaded plunger 108 (FIG. 17) is arranged to abut a side of the block 82 and seat in either of two detents 110, or 112, to hold the block in the limiting positions illustrated in FIG. 14 or FIG. 15 respectively. A compression spring 114 is arranged to constantly urge the slide piece 80 and block 82 toward the position wherein the passageways 84 and 86 are in alignment with the bores of the feed tubes 72 and 78.

A fastener escapement mechanism, as seen in FIGS. 8 and 10, is provided in the selector and delivery unit 60 for the regulated flow of fasteners therethrough. Such mechanism includes a first blade 118 which is extensible through a vertically disposed slot 120 formed in the upper feed tube 72. The blade 118 is urged inwardly by a spring 122 to engage a set screw and prevent it, as well as set screws on top of it, from dropping further in the feed tube 72. The blade 118 forms one end of a piston assemblage 124 which is pneumatically operated to retract the blade from holding engagement with a set screw.

A second blade 126 extends through a vertically disposed slot 128 formed in the upper feed tube 72, which blade is urged inwardly by means of a compression spring 130. Blades 118 and 126 are arranged to work in opposition, that is, when one is projecting into the feed tube the other one is outside thereof. In such manner, movement of fasteners is regulated so that only one fastener is delivered at a time to the passageway 84 in the block 82, as will be explained more in detail hereinafter.

Fasteners which are passed through the selector mechanism, i.e., block 82 and slide 80, enter the lower feed tube 78, pass into a connecting pipe, or tube 132, and enter a holding tube 134 supported in an escapement housing 136. The housing 136 is mounted upon a plate 138 secured to the plate 76. Projecting into a vertically extending slot 140 formed in the tube 134 is a blade 142 which defines the end of a plunger 144 urged in the direction of the tube 134 by a compression spring 146 and movable in the opposite direction by pressure fluid medium conducted to a connection 148, as best seen in FIG. 8. An inventory limit blade 150 is arranged to project through a vertically extending slot 152 formed in the lower feed tube 78. The blade 150 is urged toward the tube 78 by a compression spring 154 which abuts a bracket 156 mounted upon the plate 76. The blades 126 and 150 are adapted for synchronized operation produced by action of a rocker arm 158 pivotally supported on the bracket 156. Blades 126 and 150, which are slidably supported by the bracket 156, have end pieces 160 and 162 respectively, adapted for abutment by opposite ends of the rocker arm 158. Compression spring 154 is of greater strength than spring 130 so that under normal, or non-operative position, the rocker arm will be in position whereby the blade 126 is withdrawn from projecting into the bore of the feed tube 72 (FIG. 8). The rocker arm 158 is adapted to be engaged by an end 164 of the yoke element 94, when the latter has been moved to extreme left position (FIG. 15) so that a counterclockwise rotation of the rocker arm is produced. This has the effect of allowing the blade 126 to project into the upper feed tube 72 and simultaneously withdraw the blade 150 from projection in the lower feed tube 78. It is to be noted that movement of blades 126 and 150 are always in opposition; i.e., when blade 126 is moved to the left, blade 150 is moved to the right, and vice versa.

Rotatably mounted in the escapement housing 136, and at the lower end of the holding tube 134, is a cylinder 166 having a passageway 168 extending therethrough. In vertical position of repose (FIG. 10) the passageway is in alignment with the bore of tube 134 so that a fastener may pass into the passageway 168. Rotation of the cylinder 166 is effected by a pressure fluid operated motor means including a cylinder 170 and a piston 172 the end of the latter being pivotally attached to an arm 174 affixed to an end portion of the cylinder 166. The upper end of the cylinder 170 is pivotally attached to a bracket 176 affixed to the plate 76. Hose connection means 178 and 180 are arranged for conduction of pressurized medium, such as compressed air, into opposite ends of the cylinder 170 whereby reciprocal movement of the piston 172 is effected.

In the rotated position of the cylinder 166 (FIG. 11), the passageway 168 is brought into axial alignment with the bore of a connecting piece 182 mounted in the housing 136. The connecting piece 182 is adapted to receive the end of the hose 44 whereby a fastener element will pass from the connecting piece into the hose 44. Arcuate movement of the cylinder 166 is limited by reason of a pin 184 which is mounted in the housing 136 so that an end of the pin projects into an arcuate slot 186 formed on a peripheral surface of the cylinder 166, as seen in FIG. 9. The ends of the slot 186 are set to limit rotation of the cylinder 166 so that the passageway 168 will be either in alignment with the bore of the tube 134 (FIG. 10), or with the bore of the connecting piece 182 (FIG. 11). Pressurized medium, such as compressed air, is directed into the cylinder passageway 168 by way of a connection 188 when the cylinder 166 is in the FIG. 11 position. In such manner, a fastener 64 is propelled along within the hose 44 so that it is delivered to the fastener driving assemblage 42.

Operation of the fastener selector and delivery unit 60, whereby set screws are sequentially delivered in properly oriented manner to the hose 44, will now be described.

Assume that the vibratory hopper 58 is in operation so that a supply of set screws 64 will be delivered to the upper feed tube 72. Such set screws will have a random longitudinal orientation, that is, some will be properly oriented with the set point in lowermost position, while others will be improperly oriented with the socket wrench opening in lowermost position (FIG. 14). A column of such set screws (FIG. 12) will be held in the upper feed tube 72 by reason of the blade 118 abutting the side of the lowermost set screw.

Upon activation of the motor 98, the plunger 96 will move the yoke element to the left as viewed in FIGS. 8 and 12 through 17, so that the yoke element will move the slide piece to the left. A set screw within the block passageway 84 which is in proper orientation, i.e., set point lowermost, will drop through the slide piece hole 106 and enter the lower feed tube 78. Toward the end of the leftward movement of the yoke element 94, the rocker arm 158 will be engaged by the yoke piece end 164 resulting in a counterclockwise rotation of the rocker arm. Such action will allow leftward movement of the blade 126 under the action of spring 130 so that the blade will project into the upper feed tube 72. Simultaneously, the first blade 118 will be caused to retract from holding engagement with the lowermost set screw in the upper feed tube resulting in a dropping of the column of set screws so that the lowermost one will set upon the blade 126 and the entire column will be supported.

Counterclockwise rotation of the rocker arm 158 will cause the lower end thereof to abut the end piece 162 and move the limit blade 150 to the right, further compressing the spring 154.

Reverse movement of the plunger 96, that is, rightward movement, will release engagement of the yoke piece end 164 with the rocker arm 158. Spring 154 will thus be free to expand causing clockwise movement of the rocker arm by reason of the engagement thereupon by the blade end piece 162. Such clockwise movement of the rocker arm will cause a rightward movement of the second blade 126 by reason of the fact that the rocker arm is in engagement with the blade end piece 160. As a result of such rightward movement of the blade 126, the spring 130 will be further compressed and the end of the blade will be drawn from within the bore of the upper feed tube 72. Just prior to such blade retraction movement, the first blade 118 will be deactivated to exert holding pressure upon the set screw just above the set screw being supported by the blade 126. It will be seen that withdrawal of the blade 126 from the bore of feed tube 72, and hence, from beneath the set screw, will allow the set screw to drop toward the block 82 and enter the passageway 84 when the latter is moved into alignment with the bore of the feed tube 72.

Blade 150 has been termed an "inventory limit blade" because it functions to limit the maximum number of set screws that can be stored in the lower feed tube 78. It effects such control in the following manner. Assume that the set screws in the lower feed tube 78 develop a columnar height which would prevent the blade 150 from moving back into the lower feed tube by reason of abutment with the uppermost set screw, as illustrated in FIG. 16. As a result, the blade 150 would be prevented from moving leftward under the expansion force of spring 154, thus preventing clockwise movement of the rocker arm 158. Consequently, rightward movement of the blade 126 would not take place and the column of set screws supported by the blade 126 will be maintained without depletion until called for by drop in set screw column height in the lower feed tube 78 to the point where the blade 150 can again project into the bore of the feed tube.

The fastener driving assemblage 42 (FIGS. 19 and 20) includes a base 190 on which is fixedly mounted a rear pedestal 192, a front pedestal 193, and a pair of guide pieces 194. Extending between the pedestals and supported parallel with the base 190 are parallel spaced guide rods 196 which slidingly support a crosspiece 198. The latter serves as a support for an air operated motor 200 which rotates a wrench element 202, having a socket screw engaging end, extending forward to the front pedestal 193.

Means is provided for causing reciprocal movement of the crosspiece 198, comprising a cylinder 204 and a piston including a piston rod 206, the forward end of which has a grooved knob 208 affixed thereto. As best seen in FIG. 28, the knob 208 seats in a recess 210 formed in the crosspiece 198 and has a circumferential V-shaped groove 211 which is engaged by a detent 212 urged into engagement with the groove 211 by a helical spring 214. The compression of the spring 214 may be adjusted by means of a screw 216 threadedly received by the crosspiece 198. The detent allows disengagement between the piston rod 206 and the crosspiece 198 when the resistance to forward movement of the crosspiece, e.g. toward the front pedestal 193, exceeds the holding effort of the detent 212 upon the knob 208. The reason for such a breakaway connection will be explained in greater detail hereinafter.

A slide piece 218, guidingly maintained between the guide pieces 194 and slidable upon the base 190, is movable relative the front pedestal 193 by means of a screw 220. Mounted upon the slide piece 218 is a normally open electrical switch LS–5 having a plunger 222 positioned in axial alignment with the piston rod 206. It will be seen that positional adjustment of the switch LS–5 relative to the end of the piston rod 206 is afforded by the screw 220.

The front pedestal 193 includes a forwardly projecting fastener receiving portion 224, the longitudinal axis of which is in substantial alignment with the axis of the wrench element 202. As best seen in FIGS. 21, 22, 24 and 25, a fastener element receiving and orienting means, which is in the form of a cylindrical piece 226, is rotatably supported in the portion 224 with the axis of rotation transverse to the axis of the wrench element 202 and parallel with the base 190. A diametrical hole 228 is formed in the cylindrical piece 226 which is of a size to slidingly accommodate a fastener element 64. An indexing pin 230, positioned in the portion 224, is arranged to project into a slot 232 formed on a peripheral surface of the cylindrical piece 226. The end limits of the slot 232 are such as to allow rotary positioning of the cylindrical piece 226 so that the hole 228 is in alignment with the bore of a connecting piece 234 (FIG. 21), or is in alignment with the bore of a guide piece 235 (FIG. 22). The latter is arranged to slidingly receive the wrench element 202. Connecting piece 234 is adapted for connection with the lower end of the flexible hose 44.

An axial shaft 236 is formed integral with the cylindrical piece 226 and projects beyond one side of the portion 224. Affixed to this shaft is an arm or crank member 238 which is pivotally connected to a link member 240, the other end of the latter being pivotally secured to a yoke piece 242. The yoke piece 242 is affixed to one end of a rod 244 which is arranged for axial movement to effect rotation of the cylindrical piece 226 to either of the rotary limiting positions. The other end of the rod 244 is slidingly supported in the crosspiece 198. A flanged bushing 246 is slidingly mounted upon the rear end of the rod 244 which extends through the crosspiece 198, said bushing being adapted to abut a collar 247 secured to the rod in the forward direction, i.e., toward the front pedestal 193. A helical spring 248 is positioned between the bushing 246 and a collar 250 of a sleeve 252 secured to the rod 244, which rod is slidable in a passageway 256 formed in the rear pedestal 192. A helical spring 258 is compressively arranged between the collar 250 and the side of the rear pedestal 192. Spring 248 is of greater strength than spring 258 so that upon forward movement of the crosspiece 198, the rod 244 will be moved with the crosspiece due to the expansive effort of the spring 258. The spring 248 will allow a certain amount of over-travel of the crosspiece in the rearward direction, i.e., toward the rear pedestal 192 (FIG. 21).

A fastener holding collet assemblage 260 is positioned in the front end of the fastener receiving portion 224, said assemblage functioning to receive a fastener being moved from the cylindrical piece 226 by movement of the wrench element 202, and holding the fastener until drivingly coupled to the wrench element. Toward this end, the collet assemblage includes a disc-like housing 261 in which is arranged a plurality of balls 262 disposed in two sets, each set consisting of three equi-angularly spaced balls positioned in the same plane, said planes being in parallel spaced relation (FIGS. 26 and 27). The angular orientation of each of the two sets of balls is symmetrical so that in end view projection, the center lines of passageways 264, in which each ball is slidingly maintained, are sixty degrees apart. An axial hole 266 is formed in the housing 261, said hole being of slightly greater diameter than the major diameter of a fastener being handled. Each ball 262, which is arranged to project a slight amount into the passageway 266, is urged inwardly by a helical spring 268 compressively maintained between the ball and a snap ring 270 disposed within one of two peripheral grooves 272 formed on the housing 261.

The rear end of the cylinder 204 is mounted within an end head 274 secured to a block 276 which is slidingly supported between a pair of guide members 278 affixed to the base 190. Such an arrangement allows a limited amount of reciprocal axial movement of the cylinder 204. Longitudinal movement of the block 276 is resisted by helical springs 280 and 282, the former of which is disposed between a pad means 284 and the block 276, the latter of which is disposed between a pad means 286 and the opposite side of the block 276 (FIG. 23). The pad means 284 and 286 are secured to the base 190.

As seen in FIGS. 19 and 20, an electric switch LS–6, having a plunger 288 engageable by the block 276, is secured to the pad means 286, while an electric switch LS–4, having a plunger 290 engageable by the block 276, is secured to the pad means 284. An electric switch LS–1 having a plunger 292 engageable by the crosspiece 198, is mounted atop a block 294 affixed to the base 190. An electric switch LS–7, having a contact arm 296 engageable by the crosspiece 198, is mounted atop a block 298 secured to the base 190. The contact arm 296 is arranged to activate the switch LS–7 only upon forward movement of the crosspiece, i.e., when moving toward the front pedestal 193.

The operation of the fastener driving assemblage 42, under certain conditions of operation, will now be described. Reference may be had to the circuit diagram of FIG. 36 for a full understanding of the operating description.

Assume that certain parts are in the relative position shown in FIG. 21, with the screw driver motor 200 operating, and with pressure fluid directed to the cylinder 204 so that the piston rod 206 moves outwardly to cause movement of the crosspiece 198 toward the front pedestal 193.

Such movement will result in forward movement of the rod 244, due to expansive force of the spring 258, whereby the cylindrical piece 226 will be rotated so that the hole 228 will be in alignment with the bore in the guide piece 235 (FIG. 22). Simultaneous with such movement, the wrench element 202 will be moved into contact with the screw 64 within the hole 228, and cause positioning of the screw in the collet assembly 260. In such position of the screw, the socket engaging end of the wrench 202 will enter into the matching hole in the screw 64 and cause rotation of the screw. Continued forward movement of the wrench element 202 will move the screw out of the collet assembly 260 and drive it into the threaded opening of a workpiece 50. The reacting force developed by engagement of the screw with the workpiece will be transmitted to the cylinder head 274 to move the block 276 into engagement with the plunger 288 of switch LS–6 and cause opening of the circuit therethrough.

It will be seen that closing of LS–5 energizes the coil of relay R–4 to open the circuit to relay R–5 and holds on R–4 until LS–5 is opened. Such action insures proper sequence for LS–5 and LS–6, which is, LS–6 opens before LS–5 closes, and LS–5 opens before LS–6 closes. Such sequence is necessary to avoid a false signal which could adversely affect subsequent automatic inspection function of the device, as will be more apparent hereinafter.

When the screw has been driven, or set, a predetermined distance in the workpiece, the knob 208 will engage the plunger 222 of switch LS–5 to close the circuit therethrough. Such action will energize a solenoid 302 causing a reversal of air pressure on the piston in the cylinder 204 to cause reverse movement of the piston rod 206. Simultaneously, solenoids 304 and 306 will be energized to cause retracting of the piston 172 and cause a brief blast of air to pass through the cylinder passageway 168, respectively. The flow of air through the passageway 168 propels the screw from the passageway 168 through the hose 44 and into contact with the peripheral surface of the cylindrical piece 226. Such action, i.e., propelling action on the screw 64, occurs very rapidly and slightly in advance of rotary movement of the cylinder 166. Rotation of the cylinder 226 from the FIG. 21 position to the FIG. 22 position does not take place until toward the end of rearward movement of the crosspiece 198.

As previously mentioned, the device will automatically operate to assure setting of a screw in each workpiece, and in event such is not accomplished, the machine will stop and signal for attention. Consider the situation wherein a screw is missed, that is, there is no screw on the end of the screw driving element as the latter is advanced to the workpiece. Under such condition, there will be no reaction force to open LS–6. At the end of the forward stroke, LS–5 will be closed thus energizing the coils for reverse operation of the screw drive piston 206, the escapement piston 172 and the coil for relay R–5. Closing of the contacts on R–5 will complete circuits through the coil for relay R–3, the re-cycle light 308, the coil for relay R–2, and the timer 310. When contacts on R–3 close, one establishes holding circuit through R–3, a second contact closes in parallel with LS–1, and a third contact closes in parallel with LS–2 and LS–3.

The piston 206 of the drive cylinder will start to retract, and LS–5 will be opened causing R–5 to drop out thereby opening the contacts of R–5. The coil of relay R–3 will continue to be energized thus holding R–3 in operative condition and maintaining the re-cycle light 308 in "on" condition. R–2 and the timer 310 will be maintained in operative condition by the closed contact of R–2. At the end of the retraction stroke of the piston rod 206, LS–1 will be closed. Since R–3 is closed, the circuit will be completed through the drive cylinder solenoid 302 ad the escapement advance solenoid 304. Relays R–1, R–2, and timer 310 will be maintained in operative condition because the contacts on R–2 and R–3 are still closed. As the piston 206 advances, LS–7 is opened, causing R–3 to drop out and the contact of R–3, in the re-cycle circuit, is opened. The relays R–1, R–2 and the timer 310 will be maintained in operative condition because LS–1 is open.

If no screw is driven, the steps set forth in the preceding paragraph are repeated until the timer, which may be pre-set for any time period, will operate to open LS–8 thus breaking the re-cycle circuit. The piston 206 will then stop in retracted position, and the circuit will be maintained through R–1, R–2 and R–3. The index-off light 312, the cycle-off light 314 and the re-cycle light 308 will now all be "on."

To restore the device to initial operative condition, the reset button PB–2 is actuated which causes interruption of the circuit through relays R–3. As a result, the circuit to R–1, R–2 and the timer 310 is broken, and the screwdriver motor 200 is again energized.

If a screw is missed but another screw is driven before the timer opens LS–8, the device will restore itself to normal, or initial operation in the following manner. The reactive force moves the block 276 so that LS–6 is opened. At the end of forward movement of the rod knob 208, LS–5 is closed, and retraction movement of the piston rod 206 occurs as in a normal driving cycle. At the end of such retraction movement, LS–1 is closed, disrupting the circuit through R–2, R–1 and the timer 310, whereupon the device is restored to initial operative condition.

In event there is a failure to complete the forward stroke of the screwdriver element 202, because of an untapped hole in a workpiece 50, or in event of jamming of a screw in the collet assembly 260, the following action will take place. The detent knob 208 on the piston rod 206 will be forced from holding engagement with detent 212, and will move forward to make contact with the plunger 222 of LS–5. As a result, circuits will be established to cause retraction movement of the piston 206 in the manner as previously set forth, and a subsequent driving action will take place.

In event the screwdriver element 202 becomes wedged in the screw being set so that the element 202 cannot be withdrawn from the set screw, the screwdriver motor 200 will be stalled. As in the foregoing paragraph, the detent knob 208 on the piston rod 206 will be forced from holding engagement with detent 212, and will move forward to make contact with the plunger 222 of LS–5. As a result, circuits will be established to cause retraction movement of the piston 206. The reactive force transmitted to the cylinder head 276 will cause LS–4 to be closed, which in turn will disrupt the circuit through the solenoid 315 of the valve controlling flow of compressed air to the screw driver motor 200, and cut off motive power thereto. The screwdriver element 202 will then be withdrawn from the set screw by rearward movement of the motor 200.

Attention is directed to the fact that switch LS–1 must be open for switch LS–4 to complete a circuit, hence, LS–1 functions when the crosspiece 198 moves away from abutment with plunger 292 of LS–1. Proper operational sequence for LS–1 and LS–4, when the cylinder 204 is retracted normally, is provided by spring loads. The sequence is: LS–1 closes before LS–4 closes, and LS–4 opens before LS–1 opens.

Study of the schematic diagrams of FIGS. 35 and 36 should further clarify the overall operating principle of the device of the invention. The relay 322 (not shown) is a component part of the turntable assemblage and functions to complete electric circuitry through the various units associated with the turntable, such as the tapping unit 52. Elements 316, 318 and 320 are identified in FIG. 36, as well as in other figures of the drawings, to provide a full understanding of their relative location in the device of the invention. The position of the operative parts of the various components are shown in FIG. 36 in non-operative condition of the device, that is, with the power off.

Figure 13:
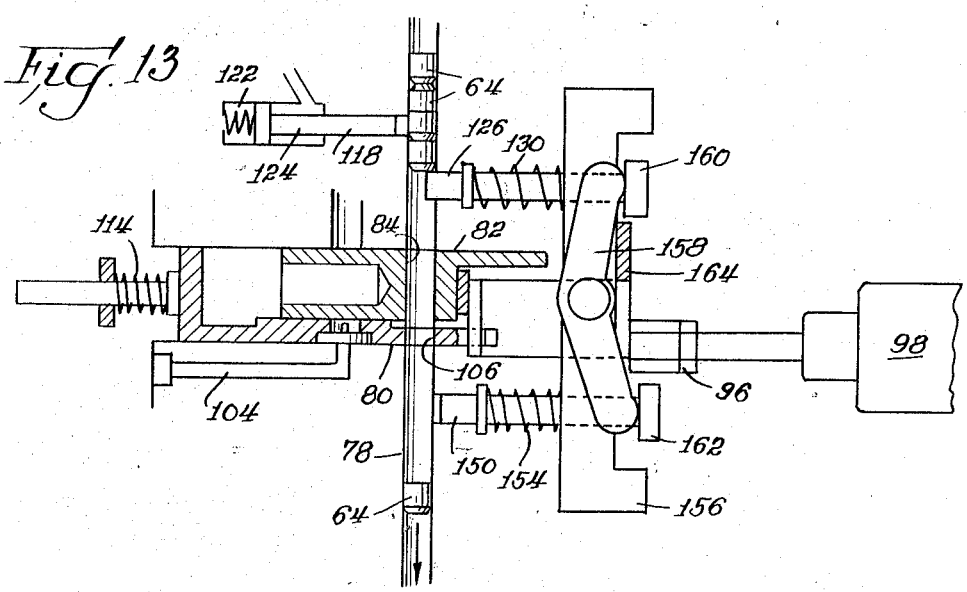
Figure 33:
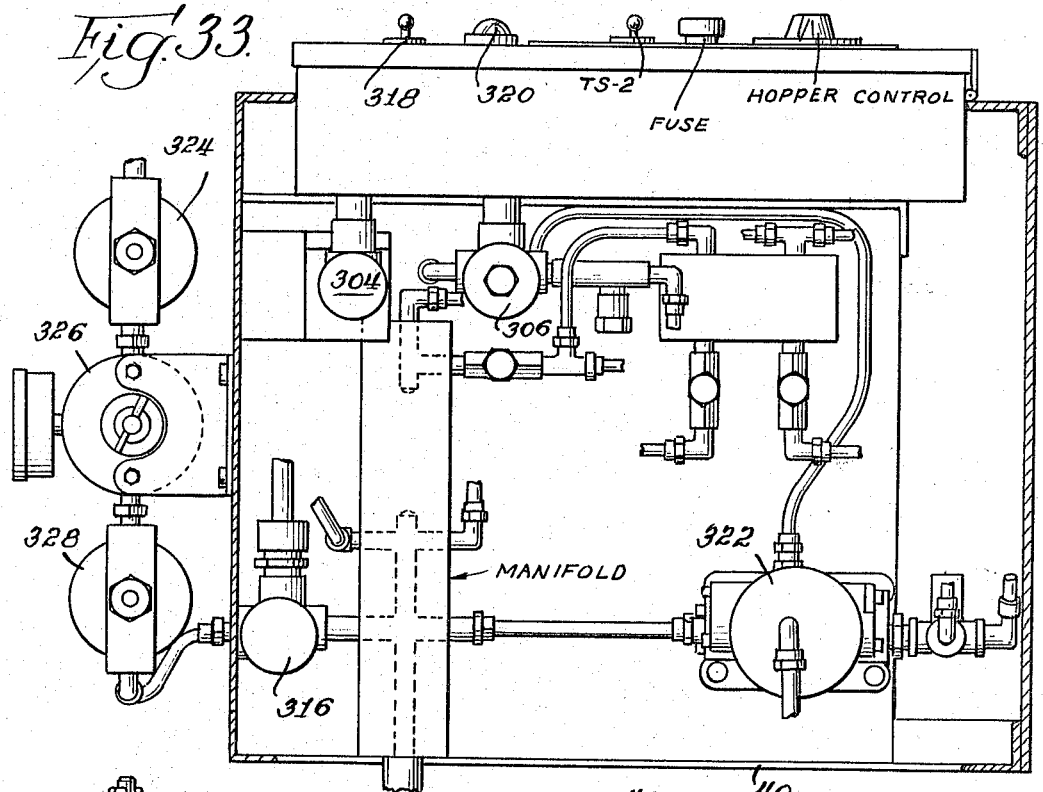
FIG. 33 is a plan view illustrating the relative position of various elements included in the main assemblage of the apparatus.
Figure 34:
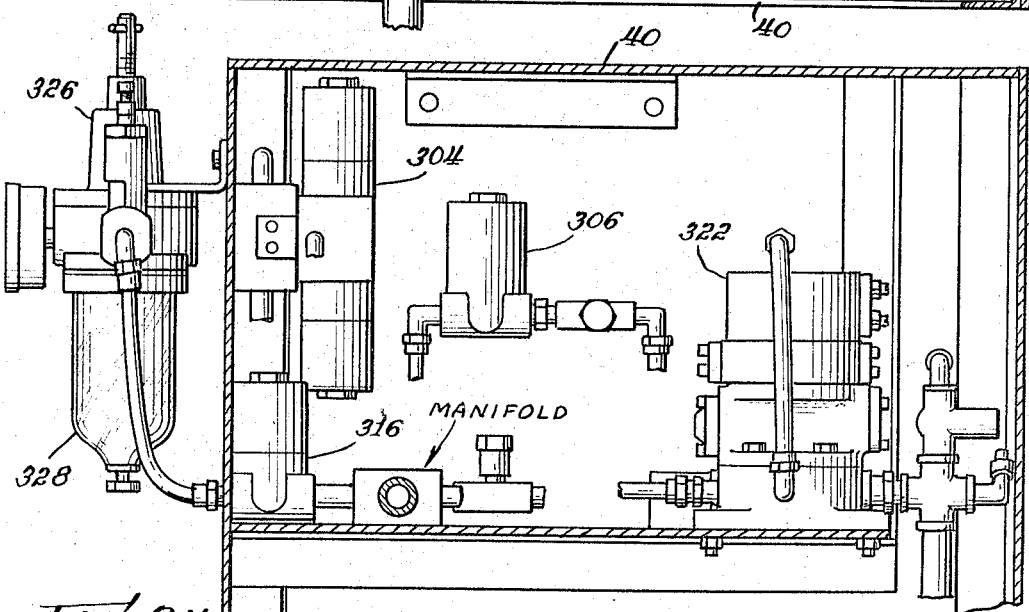
FIG. 34 is a side view of the same.

As seen in FIG. 35, the pneumatic circuit includes a three-way time delay valve 322 which may be of the type made by the Ross Operating Valve Company of Detroit, Mich., with slight modifications. The valve 322 functions automatically to receive compressed air from a manifold and to intermittently deliver air for operation of the selector blades 126 (FIGS. 12–17) and 118 (FIGS. 12 and 13). It will be seen that the exhaust from the valve 322 is passed into the pipes 73 and 102 for previously described reasons. A filter 324, a regulator 326, and a lubricator 328 may be arranged in series, as shown, for conditioning and regulating flow of the incoming compressed air. Other elements as shown in FIGS. 33 and 34, such as hose or pipe means, brackets, etc., are utilized in the construction of the device of the invention; however, such elements are of a conventional nature and require no exercise of inventive skill to design and utilize where required. It may be further pointed out that some of the tubing used for the conduction of the set screws such as tubing 44, 70, 73 and 102, may be transparent so that the passage of the screws therethrough, or any jamming thereof, may be observed.

From the foregoing, it will be seen that the disclosed invention will satisfy the objectives set forth hereinbefore.

The foregoing description is given in detail without thought of limitation since the inventive principles involved are capable of assuming other forms without departing from the spirit of the invention or the scope of the following claims.

What is claimed is:

1. A method for applying fastener elements to workpieces comprising the steps of receiving randomly oriented and axially aligned fastener elements from a supply source, rejecting all fastener elements which are not oriented in a desired manner, passing in axial alignment all desirably oriented fastener elements to an escapement means, operating the escapement means to release one fastener element at a time, passing a released fastener element to a holding station, releasing a fastener from the holding station to a fastener driving means, and operating the fastener driving means to drive the fastener into engagement with a workpiece.

2. A method for applying homogeneous fastener elements to workpieces comprising the steps of receiving randomly oriented and axially aligned fastener elements from a supply source, returning to the supply source all fastener elements which are not oriented in a desired manner, passing in axial alignment all desirably oriented fastener elements to an escapement means, operating the escapement means to release one fastener element at a time, passing a released fastener element to a holding station, releasing a fastener from the holding station to a fastener driving means, and operating the fastener driving means to drive the fastener into predetermined engagement with a workpiece.

3. A method according to claim 2, including the step of discontinuing operation of the fastener driving means when the axial pressure applied to a fastener during a driving operation exceeds a predetermined value.

4. A method according to claim 2, including the step of discontinuing operation of the fastener driving means when the condition of the workpiece is such as to prevent receipt of the fastener element.

5. A method of applying homogeneous fastener elements to workpieces which are supported upon a rotary table comprising the steps of receiving randomly oriented and axially aligned fastener elements from a supply source, rejecting to the supply source all fastener elements which are not oriented in a desired manner, passing in axial alignment all desirably oriented fastener elements to an escapement means, operating the escapement means to release one fastener element at a time, passing a released fastener element to a holding station, releasing a fastener element from the holding station to a fastener driving means, operating the fastener driving means to drive the fastener into predetermined engagement with a workpiece, and synchronizing the operation of the fastener driving means with operation of the table so that a workpiece will be indexed into proper position for receiving the fastener element.

6. A device for automatically selecting and applying fastener elements to workpieces in sequential and intermittent manner comprising: selector means arranged to receive a supply of randomly oriented and axially aligned fastener elements from a supply source, said selector means being operative to reject all fastener elements which are not oriented in a desired manner and to pass all properly oriented fasteners, a first escapement means arranged to receive fasteners from the selector means, said escapement means being arranged to release one fastener at a time to a second escapement means, and a fastener driving assemblage including means to receive a fastener from the second escapement means and drive it into a workpiece.

7. In a device for automatically selecting and applying fastener elements to workpieces in sequential and intermittent manner, a selector means including a slide piece and a block, said slide piece being movable simultaneously with the block in one condition of operation and being movable independently of the block in another condition of operation, said block being formed to provide a passageway extending therethrough, said slide piece being formed to provide a passageway extending therethrough, which slide piece passageway may be positioned in axial alignment with the passageway of the block in one relative position of the block and slide piece, said slide piece being formed to provide a hole which may be positioned in axial alignment with the passageway of the block in another relative position of the block and slide piece.

8. In a device for automatically selecting and applying fastener elements to workpieces in sequential and intermittent manner, a selector means according to claim 7, wherein a selector disc is positioned at one end of the slide piece passageway, said selector disc having an axially arranged center pin projecting upwardly into the slide piece passageway, said center pin being of less diameter than a wrench socket hole in a fastener element, said selector disc being formed to provide one or more holes adjacent the center pin.

9. In a device for automatically selecting and applying fastener elements to workpieces in sequential and intermittent manner, a fastener escapement means including a first blade which is arranged for projection into a first feed tube for engagement with a fastener element to prevent movement thereof, a second blade arranged for projection into said feed tube for engagement with a fastener element to prevent movement thereof, an inventory limit blade arranged for projection into a second feed tube which is in axial alignment with the first feed tube, and blade operating means to operate said blades so that fastener elements will move in the feed tubes in sequential manner.

10. In a device according to claim 9, wherein said inventory blade will restrict operation of the blade operating means when the inventory blade is in engagement with a fastener element.

11. In a device according to claim 10, wherein said blade operating means includes a rocker arm which is pivoted in its mid-region to a bracket for rotary movement, an end of said arm being in abutment with an end of the second blade while the other end of said arm is in abutment with the inventory limit blade, and spring means to urge said blades in abutment with the rocker arm, said spring means and rocker arm being arranged so that movement of the second blade and the inventory limit blade will be in direct opposition, said second blade and said inventory blade being of such length as to be moved completely out of the feed tube interiors when in maximum retracted positions.

12. In a device according to claim 11, wherein relative movement of said first and second blades is in opposition.

13. In a device for automatically selecting and applying fastener elements to workpieces in sequential and intermittent manner, a fastener selector means including a slide piece and a block, a fastener escapement means for regulating flow of fasteners to and from the selector means, said slide piece being movable simultaneously with the block in one condition of operation and being movable independently of the block in another condition of operation, said block being formed to provide a passageway extending therethrough, said slide piece being formed to provide a passageway extending therethrough, which slide piece passageway may be positioned in axial alignment with the passageway of the block in one relative position of the block and slide piece, said slide piece being formed to provide a hole which may be positioned in axial alignment with the passageway of the block in another relative position of the block and slide piece, said fastener escapement means including a plurality of blade means which are projectionable into feed tubes which are positioned in axial alignment with the passageway of the block in one operative position of the block, a rocker arm pivoted in its mid-region to a bracket for rotary movement, said rocker arm being arranged to allow sequential movement of two of said blade means when said rocker arm is rotated, and a yoke element for moving said slide piece and said rocker arm.

14. In a device according to claim 13, wherein a selector disc is positioned at one end of the slide piece passageway, said selector disc having an axially arranged center pin projecting upwardly into the slide piece passageway, a plurality of holes formed in the selector disc adjacent said pin, said center pin being of less diameter than a wrench socket hole in a fastener element whereby to engage a fastener element so that the slide piece and the block will be keyed together for simultaneous movement.

15. In a device according to claim 14, wherein said slide piece and block are movable so that the block passageway is brought into alignment with a reject tube, and means to admit compressed air through the selector disc holes to blow a fastener through the block passageway and into the reject tube.

16. In a device for automatically selecting and applying fastener elements to workpieces in sequential and intermittent manner, comprising a fastener selector means, a fastener escapement means for regulating flow of fasteners to and from the selector means, an escapement housing for receiving fasteners from the fastener escapement means, said housing including a cylinder which is formed to provide a passageway therethrough, said cylinder being rotatable so that said passageway may be brought into axial alignment with a connecting pipe receiving fasteners from the fastener escapement means, said cylinder being further rotatable so that said passageway may be brought into alignment with a flexible hose, and cylinder operating means for rotation of said cylinder.

17. In a device according to claim 16, wherein a holding blade is projectable into the escapement housing to sequentially release fasteners from the connecting pipe for flow to the cylinder.

18. In a device according to claim 17, wherein means are provided to admit compressed air to the escapement housing to blow a fastener from the cylinder passageway into the connecting pipe.

19. In a device for automatically selecting and applying fastener elements to workpieces in sequential and intermittent manner, a fastener element releasable holding means comprising a body member formed to provide a passageway therethrough, and a plurality of equiangularly spaced resiliently mounted abutment elements projecting into the passageway, said abutment elements being arranged for engagement with a fastener element in the passageway to hold the fastener element in a predetermined position until pushed axially from the passageway, said abutment elements being arranged to allow rotary movement of the fastener element when in abutment therewith.

20. In a device for automatically selecting and applying fastener elements to workpieces in sequential and intermittent manner, a fastener element releasable holding means comprising a body member formed to provide a passageway therethrough, a plurality of equi-angularly spaced balls slidably arranged in recesses so that a portion of each ball projects into the passageway, and resilient means arranged to urge each ball toward said passageway, said balls being adapted to releasably hold a fastener element in said passageway.

21. In a device for automatically selecting and applying fastener elements to workpieces in sequential and intermittent manner, a fastener element collet means comprising a disc-like member having parallel sides, said member being formed to provide a passageway extending from one side surface to the opposite side surface, said member being further formed to provide a plurality of equi-angular radially directed recesses opening into said passageway, a ball slidably positioned in each recess and arranged to project into the passageway, and a spring positioned to urge each ball in the direction of the passageway.

22. A fastener element collet means according to claim 21, wherein said recesses are arranged to lie in the same plane which plane is substantially parallel with a side of the disc.

23. A fastener element collet means according to claim 21, wherein said recesses are arranged in two groups, each of said groups lying in an individual plane parallel with a side of the disc, the recesses of one group being equi-angularly spaced relative to the recesses of the other group.

References Cited by the Examiner

UNITED STATES PATENTS

| | | | |
|---|---|---|---|
| 3,030,705 | 4/1962 | Gill | 29—526 |
| 3,040,422 | 6/1962 | Lewis | 29—240 |
| 3,057,051 | 10/1962 | Frank et al. | 29—203 |
| 3,120,053 | 2/1964 | Lewis | 29—407 |

JOHN F. CAMPBELL, *Primary Examiner.*

THOMAS H. EAGER, *Examiner.*